US009191350B2

(12) United States Patent
Chen et al.

(10) Patent No.: US 9,191,350 B2
(45) Date of Patent: *Nov. 17, 2015

(54) RECEIVING EMAIL ATTACHMENTS WHEN A MAILBOX IS FULL

(71) Applicant: International Business Machines Corporation, Armonk, NY (US)

(72) Inventors: Li Chen, Cary, NC (US); James P. Eberwein, Raleigh, NC (US); John R. Hind, Raleigh, NC (US); Henri F. Meli, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/087,888

(22) Filed: Nov. 22, 2013

(65) Prior Publication Data
US 2014/0108574 A1 Apr. 17, 2014

Related U.S. Application Data

(63) Continuation of application No. 13/113,395, filed on May 23, 2011, now Pat. No. 8,601,075.

(51) Int. Cl.
*G06F 15/16* (2006.01)
*H04L 12/58* (2006.01)
(52) U.S. Cl.
CPC ............... *H04L 51/08* (2013.01); *H04L 51/04* (2013.01); *H04L 51/066* (2013.01)
(58) Field of Classification Search
CPC ...... H04L 51/066; H04L 51/04; H04L 12/585
See application file for complete search history.

(56) References Cited

U.S. PATENT DOCUMENTS

| 5,930,337 | A | 7/1999 | Mohler |
| 6,292,825 | B1 | 9/2001 | Chang et al. |
| 6,360,252 | B1 | 3/2002 | Rudy et al. |
| 6,934,743 | B2 * | 8/2005 | Huat ............................. 709/218 |
| 7,089,286 | B1 * | 8/2006 | Malik ........................... 709/206 |
| 7,305,385 | B1 | 12/2007 | Dzikiewicz et al. |
| 7,305,430 | B2 | 12/2007 | Choubey et al. |
| 7,366,779 | B1 * | 4/2008 | Crawford ...................... 709/227 |
| 7,370,278 | B2 * | 5/2008 | Malik et al. .................. 715/758 |
| 7,774,420 | B2 | 8/2010 | Keohane et al. |
| 8,285,799 | B2 | 10/2012 | Edelen |
| 8,631,078 | B2 * | 1/2014 | Wherry et al. ................ 709/206 |
| 2003/0055907 | A1 | 3/2003 | Stiers |
| 2004/0062365 | A1 | 4/2004 | Agraharam et al. |
| 2004/0203947 | A1 * | 10/2004 | Moles ........................... 455/466 |
| 2005/0108335 | A1 * | 5/2005 | Naick et al. .................. 709/206 |

(Continued)

*Primary Examiner* — Razu Miah
(74) *Attorney, Agent, or Firm* — Cuenot, Forsythe & Kim, LLC

(57) ABSTRACT

Within a system comprising a processor and a memory, a method of sending an attachment of a first electronic mail (email) to a recipient. The method includes receiving the first email addressed to the recipient and, via the processor, determining whether a volume of data contained in the recipient's electronic mailbox has reached a threshold level. When the volume of data has reached the threshold level, via the processor, establishment of an instant messaging session with an instant messaging client associated with the recipient can be initiated. The attachment can be caused to be attached to an instant message. Sending of the instant message to the instant messaging client associated with the recipient can be initiated.

20 Claims, 4 Drawing Sheets

(56) References Cited

U.S. PATENT DOCUMENTS

| | | |
|---|---|---|
| 2006/0031357 A1 | 2/2006 | Misra et al. |
| 2006/0168061 A1* | 7/2006 | Enatsu et al. ............... 709/206 |
| 2007/0136427 A1* | 6/2007 | Zellner et al. ............... 709/206 |
| 2007/0157114 A1 | 7/2007 | Bishop et al. |
| 2007/0180035 A1 | 8/2007 | Liu et al. |
| 2008/0109448 A1 | 5/2008 | Aboel-Nil et al. |
| 2008/0109820 A1 | 5/2008 | Raghunandan |
| 2008/0183824 A1 | 7/2008 | Chen et al. |
| 2008/0189379 A1 | 8/2008 | Naick et al. |
| 2008/0281924 A1* | 11/2008 | Gadwale ...................... 709/206 |
| 2009/0172399 A1* | 7/2009 | Schmid ........................ 713/168 |
| 2009/0186634 A1 | 7/2009 | Sureka et al. |
| 2009/0259821 A1 | 10/2009 | Yasrebi et al. |
| 2009/0313342 A1 | 12/2009 | Thie |
| 2010/0005399 A1 | 1/2010 | Friedman et al. |
| 2010/0312844 A1 | 12/2010 | Katis et al. |
| 2011/0066687 A1 | 3/2011 | Chen et al. |
| 2011/0119258 A1 | 5/2011 | Forutanpour et al. |
| 2011/0125853 A1 | 5/2011 | Weber |
| 2011/0264630 A1 | 10/2011 | Edelen |
| 2012/0036261 A1 | 2/2012 | Salazar et al. |

* cited by examiner

RECEIVING EMAIL ATTACHMENTS WHEN A MAILBOX IS FULL

CROSS-REFERENCE TO RELATED APPLICATIONS

This application is a Continuation of U.S. application Ser. No. 13/113,395, filed on May 23, 2011, the entirety of which is incorporated herein by reference.

BACKGROUND

The embodiments disclosed within this specification relate to the delivery of electronic mail (email) attachments. More particularly, the embodiments relate to delivering of email attachments.

Email servers usually have a limitation with regard to how much data they can store. This limitation usually is related to the amount of physical storage space available to the email servers. To avoid reaching the storage limit, many email servers assign to each email user a certain amount of email storage space. When the user's email data reaches the assigned storage space limit, the email servers oftentimes cease delivering new emails to the user. Before the user can receive new emails, the user typically must delete emails and/or attachments from the email system to reduce the amount of storage space being used. Thus, delivery of the new emails to the user may be delayed.

BRIEF SUMMARY

One embodiment of the present relates to, within a system comprising a processor and a memory, a method of sending an attachment of a first electronic mail (email) to a recipient. The method includes receiving the first email addressed to the recipient and, via the processor, determining whether a volume of data contained in the recipient's electronic mailbox has reached a threshold level. When the volume of data has reached the threshold level, via the processor, establishment of an instant messaging session with an instant messaging client associated with the recipient can be initiated. The attachment can be caused to be attached to an instant message. Sending of the instant message to the instant messaging client associated with the recipient can be initiated.

Another embodiment of the present invention relates to, within a system comprising a processor and a memory, a method of sending an attachment of a first electronic mail (email) to a recipient. The method includes receiving the first email addressed to the recipient and, via the processor, determining whether a volume of data contained in the recipient's electronic mailbox has reached a threshold level. When the volume of data has reached the threshold level, via the processor, the attachment can be caused to be stored to a storage device, at least temporarily. Establishment of an instant messaging session with an instant messaging client associated with the recipient can be initiated. The attachment can be caused to be attached to an instant message. Sending of the instant message to the instant messaging client associated with the recipient can be imitated.

Yet another embodiment of the present invention can include a computer program product including a computer-readable storage medium having computer readable program code that, when executed, causes a machine to perform the various steps and/or functions described herein.

DETAILED DESCRIPTION

Figure 1:
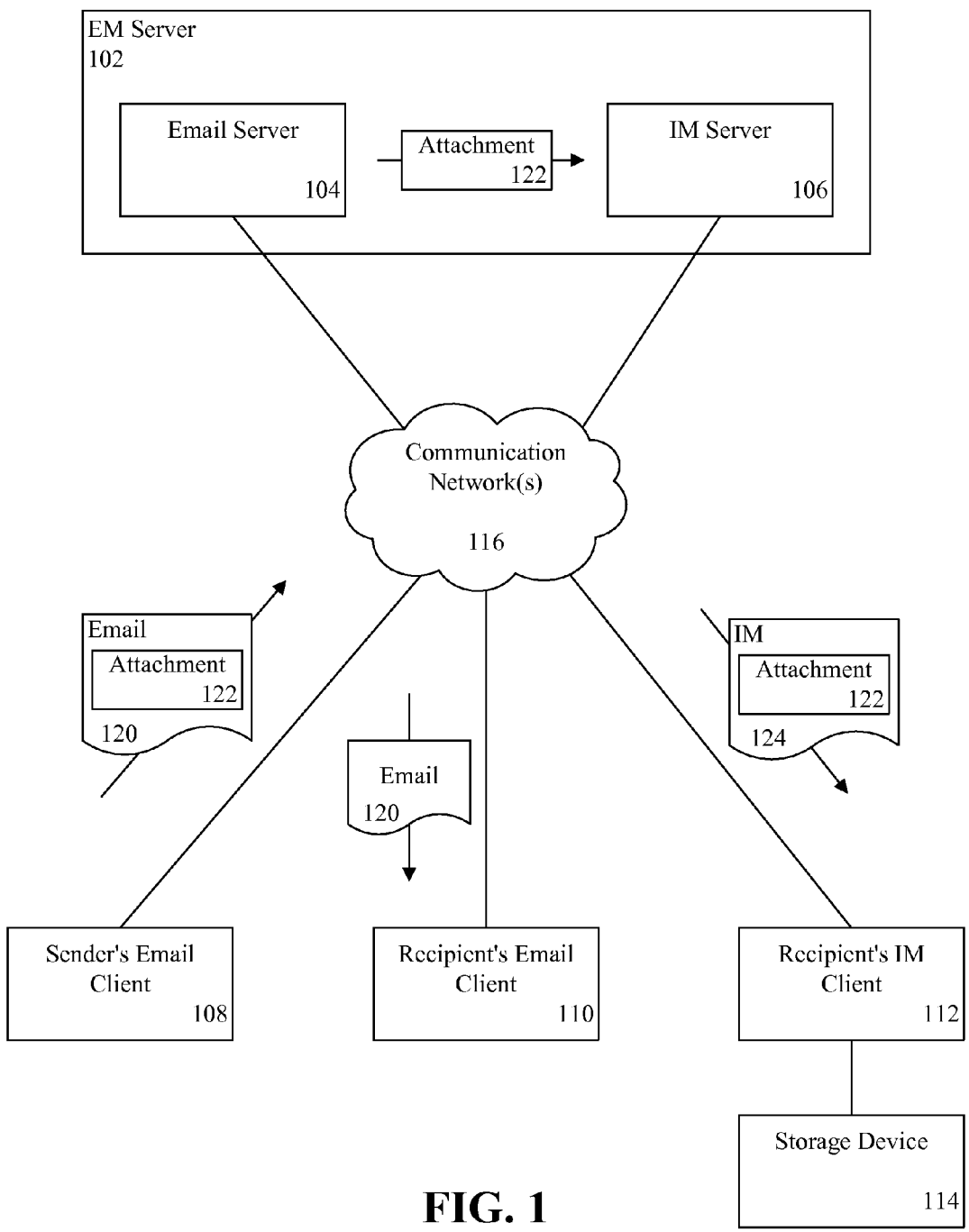
FIG. 1 is a block diagram illustrating a system for sending an attachment of an electronic mail to a recipient in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention relate to sending an attachment of an electronic mail (hereinafter "email") to a recipient of the email when the storage capacity associated with the recipient's mailbox has reached a threshold level. Specifically, an electronic messaging server (hereinafter "EM server") can determine whether a volume of data contained in the recipient's electronic mailbox has reached a threshold level. When the volume of data has reached the threshold level, the EM server can automatically initiate establishment of an instant messaging (IM) session with the recipient. The EM server further can cause the attachment to be attached to an instant message, and initiate sending of the instant message to an instant messaging client (hereinafter "IM client") associated with the recipient. Accordingly, the attachment can be sent to the recipient, even when the data volume contained in the recipients mailbox has reached a threshold level, in which case the recipient may not presently be able to receive the attachment via email.

FIG. 1 is a first block diagram illustrating a system 100 for sending an attachment of an electronic mail to a recipient in accordance with one embodiment of the present invention. In one aspect, the system 100 can include an EM server 102. In one embodiment, the EM server 102 can include an email server 104 and an IM server 106. The email server 104 and an IM server 106 can be implemented as applications executed by one or more processing systems. For example, both the email server 104 and an IM server 106 can be executed on a particular computing system, for examples as components of an application or as individual applications, or executed on different computing systems that are communicatively linked via a communications network or communicatively linked in another suitable manner. In another embodiment, the EM server 102 can be a component of the email server 104, a component of the IM server 106, or the EM server 102 can comprise components of both the email server 104 and IM server 106. In such arrangement, the email server 104 and IM server 106 can be communicatively linked in a suitable manner.

The system further can include an email client 108 associated with an email sender, an email client 110 associated with an email recipient, and an IM client associated with the email recipient 112. The system also can include a storage device 114 that is communicatively linked to the recipient's IM client 112. For example, the storage device 114 can be a local storage device attached to a processing system on which the IM client 112 is executed. In another arrangement, the storage device 114 can be communicatively linked to the processing system via a suitable communication network, or communicatively linked to such processing system in another suitable manner.

The sender's email client 108, recipient's email client 110 and recipient's IM client 112 can be communicatively linked to the EM server 102 via the communication network 116. The communication network(s) 116 can comprise the Internet, one or more wide area networks (WANs), one or more local area network (LANs), one or more wireless LANs, one or more cellular communication networks, or any other communication networks through which electronic messages can be propagated. In an arrangement in which the email server 104 and IM server 106 are executed on different processing systems, such systems can be communicatively linked via the communication network(s) 116. Similarly, the storage device 114 can be communicatively linked to the recipient's IM client 112 via the communication network(s) 116.

In operation, via the sender's email client 108, the sender can send to the recipient an email 120 having an attachment 122 attached thereto. The email 120 can be routed to the EM server 102, for example to the email server 104. The EM server 102 can determine whether the a volume of data contained in the recipient's electronic mailbox has reached a threshold level. For example, the EM server 102 can communicate with the email server 104 to determine whether the recipient's electronic mailbox currently has reached the threshold level, or whether delivering the email 120 with the attachment 122 to the recipient's mailbox will cause the mailbox to reach the threshold level. The electronic mailbox can be a mailbox on the email server 104 that is assigned to the recipient, or an electronic mailbox within the recipients email client 110.

The threshold level can be based on the amount of email storage space assigned to the recipient. The threshold level can be equal to the email storage space assigned to the recipient, or can be equal to a percentage of the email storage space assigned to the recipient. In illustration, the threshold level can be equal to a percentage of the email storage space assigned to the recipient.

If the volume of data contained in the recipient's electronic mailbox has reached the threshold level, the EM server 102 can direct the email server 104 to forward the attachment 122 to the IM server 106, in which case the attachment 122 can be removed or detached from the email 120. Alternatively, the EM server 102 can direct the email server 104 to forward a copy of the attachment 122 from the email 120 to the IM server 106, in which case the attachment 122 can remain attached to the email 120. In this embodiment, the attachment 122 can be removed at a later time, though this need not be the case.

The EM server 102 also can initiate establishment of an IM session between the IM server 106 and the recipient's IM client 112, cause the IM server 106 to attach the attachment to an Instant message 124, and initiate sending of the instant message 124 from the IM server 106 to the recipients IM client 112. In illustration, the EM server 102 can communicate with the IM server 106 in order to direct the IM server 106 to perform such processes. The EM server 102 can access one or more application-programming interfaces (APIs) of the email server 104 and the APIs of the IM Server 106 as needed to implement the processes described herein.

In one aspect of the invention, the IM server 106 can determine whether the IM 124 was successfully delivered to the recipient's IM client 112. If the IM 124 was not successfully delivered to the recipient's IM client 112, the IM server 106 can initiate re-sending of the instant message. The number of attempts to re-send the IM 124 can be user configurable. Moreover, the frequency at which to attempt re-sending the IM 124 also can be user configurable. The user that selects such configurations can be the sender, the recipient, or a system administrator.

Figure 2:
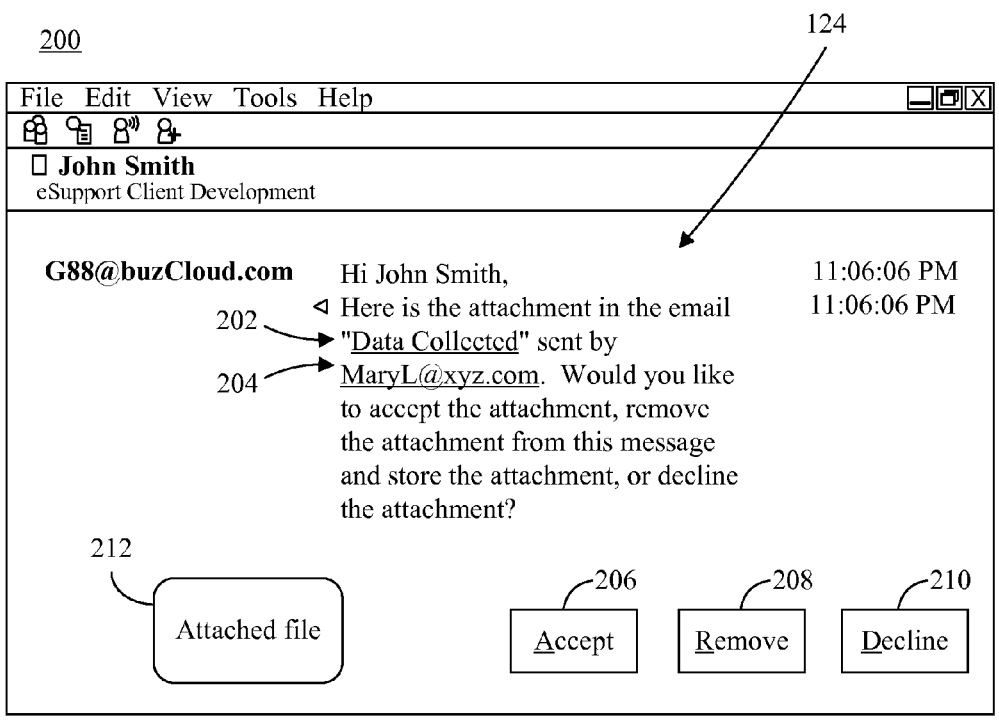
FIG. 2 is a view of an instant message in accordance with one embodiment of the present invention.

FIG. 2 is a view 200 of an IM 124 in accordance with one embodiment of the present invention. Referring both to FIG. 1 and FIG. 2, in one embodiment, when the recipient's IM client 112 receives the IM 124, the recipient's IM client 112 can present the IM 124 to the recipient in the view 200 with an indication that the attachment 122 is attached to the IM 124. Such indication can be presented in a portion, such as a header, body or footer, of the IM 124.

The IM 124 can include a hyperlink 202 to the email 120 to which the attachment was originally attached. The recipient can select the hyperlink 202 to view the content of the email 120. For example, the IM server 106 can detect selection of the hyperlink 202 and direct the email server 104 to send a copy of the email 120, with the attachment 122 removed, to the recipient's email client 110, and the email 120 can be automatically opened in the recipient's email client 110 for viewing. The IM 124 further can include a hyperlink 204 to the email address of the sender of the email 120. The recipient can select the hyperlink 204 to initiate a new email addressed to the sender via the recipient's email client 110.

The view 200 also can present to the recipient options for accepting or declining the attachment 122, or removing the attachment 122 from the IM 124. For example, selectable buttons or icons 206, 208, 210 can be presented in a body, header or footer of the view 200 to present the options. In addition, an icon or button 212 can be presented in the view 200 that provides to the user access to the attachment 122 from the IM 124.

If the recipient selects to accept the attachment 122, for example by selecting the button 206, the attachment 122 can be retained with the IM 124. Such user selection can be detected by the IM Server 106. Optionally, the IM Server 106 can notify the email server 104 that the recipient has accepted the attachment 122 via instant messaging. In response to this message, the email server 104 can remove or detach the attachment from the email 120 if the email server 104 has not already done so.

If the recipient selects to decline the attachment 122, for example by selecting the button 210, the IM server can detect such selection and the attachment 122 can be deleted from the IM 124. The icon or button 212 also can be removed from the view 200 to indicate that the attachment 122 is no longer attached to the IM 124. In such case, the email server 104 need not remove or delete the attachment 122 from the email 120. Thus, the recipient can access the attachment 122 from the email 120 if the attachment has not already been removed or detached from the email 120.

If the recipient selects to remove the attachment 122 from the IM 124, for example by selecting the button 208, the attachment 122 can be detached from the IM 124 and stored. For example, the attachment 122 can be automatically stored to a storage location on storage device 114, or the user can be prompted to indicate where to store the attachment 122. In such case, the icon or button 212 can be removed from the view 200. Optionally, the IM Server 106 can notify the email server 104 that the recipient has stored the attachment 122 from an IM. In response to this message, the email server 104 can remove or detach the attachment from the email 120 if the email server 104 has not already done so.

Further, the IM server 106 can be configured to communicate additional IMs to the recipient, and to receive IMs from the recipient. In illustration, the once an IM session has been established with the recipient, a client ID can be created by the IM server 106 to facilitate the exchange of IMs between the IM server 106 and the recipient as two regular chat members normally would do. In addition, the IM server 106 can be configured to analyze an process the content of IMs generated by the recipient and sent to the IM server 106 (e.g., to the client ID that was created). For instance, text recognition and processing functionality can be implemented in the IM server 106 or the EM server 102.

Referring again to FIG. 1, in one embodiment, the IM 124 and/or the recipient's IM client 112 can be configured to automatically initiate storage of the attachment 122 to a storage device accessible by the recipient, such as the storage device 114, when the IM is received by the recipient's IM client 112. For example, the IM server 106 can include an instruction within the IM 124 that is recognized by the recipient's IM client 112 and directs the recipient's IM client 112 to store the attachment 122 to the storage device. The location where to store the attachment 122 can be indicated by the IM 124, or selected by the recipient's IM client 112. Optionally, the IM Server 106 can notify the email server 104 that the attachment 122 has been stored. In response to this message, the email server 104 can remove or detach the attachment from the email 120.

In the arrangement in which the attachment 122 is automatically stored to the storage device 114, a hyperlink to a storage location where the attachment is stored on the storage device 114 can be provided within the IM 124, for example within a header, body or footer of the IM 124. In illustration, if the storage location is known a priori to the IM server 106, the IM server 106 can include a hyperlink to the known storage location. In the storage location is not known a priori to the IM server 106, the IM server 106 can communicate with the recipient's IM client 112 to receive an indication of where the attachment 122 will be stored prior to sending the IM 124. In another arrangement, the recipient's IM client 112 can append the hyperlink to the IM 124. For example, the IM 124 can be configured to facilitate the appending of the hyperlink to the IM 124 by the recipient's IM client 112.

Regardless of the process implemented to provide the hyperlink within the IM 124, the hyperlink can be selected by the recipient, or copied by the recipient into a browser, in order to access the attachment 122. The recipient can be provided options for opening the attachment 122, downloading the attachment 122, storing the attachment 122 to an alternate location, forwarding the attachment 122 to another recipient, etc.

In one embodiment, in lieu of, or in addition to, providing the hyperlink within the IM 124, the hyperlink can be provided within the email 120, the attachment can be removed or deleted from the email 120, and the email 120 can be sent to the recipient's email client 110. The process of including the hyperlink within the email 120 can be similar to that previously described for including the hyperlink within the IM 124. For example, the email server 104 can know a priori where the attachment 122 will be stored, and generate the hyperlink based on such knowledge. In another arrangement, the email server 104 can communicate with the IM server 106 and or the recipient's IM client 112 to receive an indication of where the attachment 122 will be stored prior to sending the email 120. In one aspect, rather than sending the original email 120 to the recipient's email client 110, the email server 104 can send to the recipient's email client 110 a different email that includes the hyperlink to the storage location where the attachment is stored on the storage device 114.

Alternatively, rather than providing the hyperlink within the email 120, or a different email, the email server 104 can append a notification to the email 120, or a different email, indicating to the recipient that the attachment has been removed from the e-mail 120 and sent to the recipient via the instant message. The email 120 (or the different email) can be sent to the recipient's email client 110.

The attachment 122 can be maintained in the storage location indefinitely, for example until deleted by the recipient or a system administrator, or the attachment 122 can be deleted from the storage location after a time period has elapsed. Such time period can be user configurable (e.g., configured by the sender, recipient or the system administrator). In one aspect, the IM server 106 can configure the IM 124 to instruct the recipient's IM client 112 to delete the attachment 122 from the storage device 114 after the time period has elapsed. In such an arrangement, the recipient's IM client 112 can be configured to understand and implement such instruction. In another aspect, the IM server 106 can access the storage device 114 after the time period to delete the attachment 122.

In accordance with the embodiments described herein, when the threshold level is less than the mailbox data volume assigned to the recipient, and the volume of data contained in the recipient's electronic mailbox exceeds this threshold level, there may be a concern that the mailbox will soon become full. The processes disclosed herein can be implemented to reduce the rate at which the mailbox fills with data, thereby delaying when the mailbox becomes full. Further, if the threshold level is equal to the mailbox data volume assigned to the recipient, there may be a concern that the email server 104 will not deliver the email 120 to the recipient. In such case, the processes disclosed herein can be implemented to ensure that the attachment 122 still is delivered to the recipient.

Figure 3:
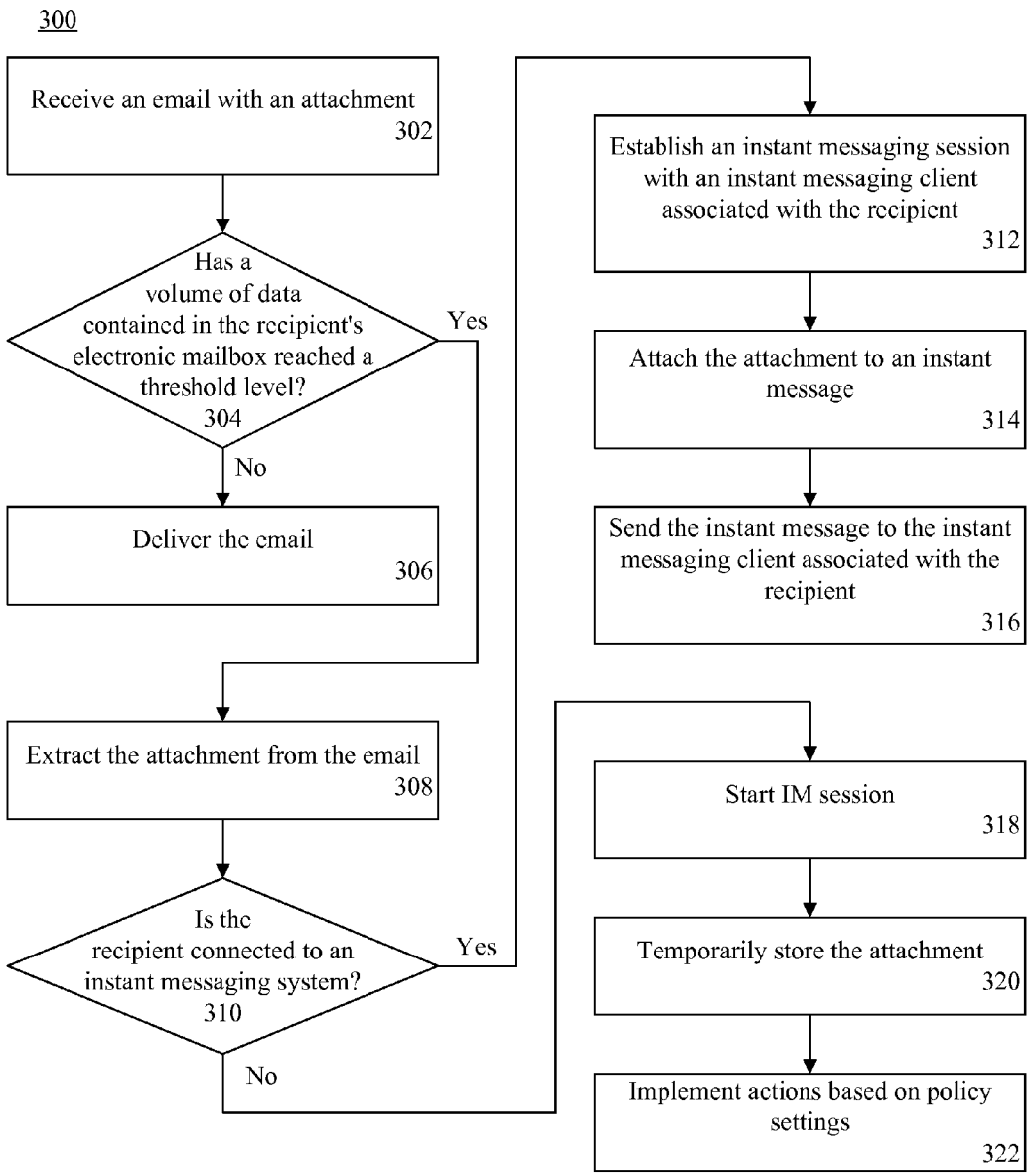
FIG. 3 is a flow chart illustrating a method of sending an attachment of an electronic mail to a recipient in accordance with another embodiment of the present invention.

FIG. 3 is a flow chart illustrating a method 300 of sending an attachment of an electronic mail to a recipient in accordance with another embodiment of the present invention. At step 302, an email with an attachment can be received. At decision box 304, the EM server or email server can determine whether a volume of data contained in the recipient's electronic mailbox reached a threshold level. If not, at step 306 the email server can deliver the email to the recipient.

When the volume of data has reached the threshold level, at step 308 the email server can extract the attachment from the email. For example, the email server can store the attachment to a temporary storage location or send the attachment to the IM server. In an alternative embodiment, rather than extracting the attachment, the email server can copy the attachment. The attachment that remains with the email later can be removed or detached from the email after the attachment has been delivered to the recipient via an instant message.

At decision box 310, the EM server or IM server can determine whether the recipient is connected to an instant messaging system. If so, at step 312 the IM server can establish an instant messaging session with an instant messaging client associated with the recipient. At step 314 the attachment can be attached to an instant message. At step 316, the instant message can be sent to the instant messaging client associated with the recipient.

Referring again to decision box 310, if the recipient is not connected to an instant messaging system, at step 318 the IM server can start an IM session. At step 320, via the IM session, the IM server can temporarily store the attachment. For example, the IM server can store the attachment locally so as to be retrievable when the recipient is connected to the instant messaging system. At step 322, the EM server and/or IM server can implement actions based on policy settings. For example, the EM server can direct the email server to send an e-mail to the recipient indicating that the attachment is available to be sent to the recipient via an IM. In another example, the IM server can monitor the recipient to determine when the recipient connects to the instant messaging system, and send an IM with the attachment when the IM server detects that the recipient is connected to the instant messaging system.

Figure 4:
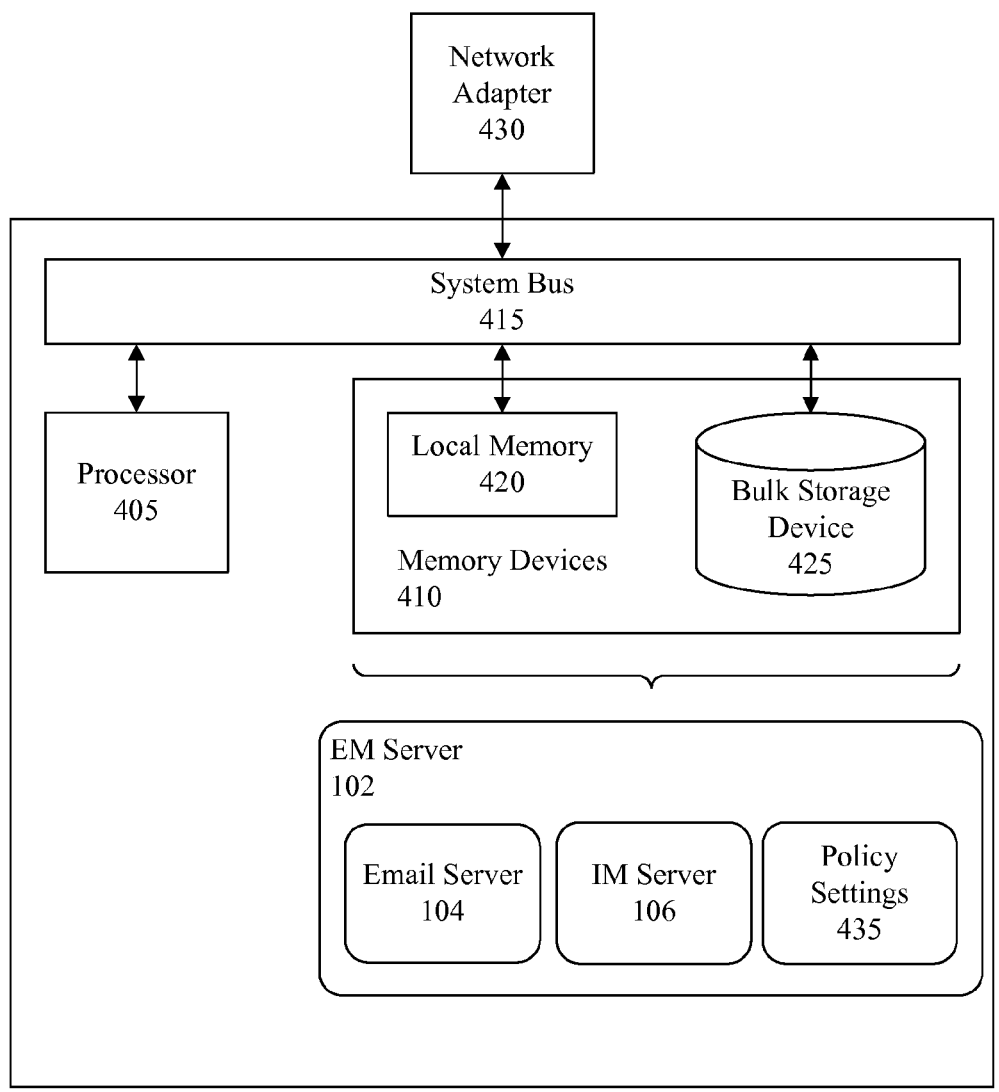
FIG. 4 is a block diagram illustrating a processing system that sends an attachment of an electronic mail to a recipient in accordance with one embodiment of the present invention.

FIG. 4 is a block diagram illustrating a processing system 400 (hereinafter "system 400") that sends an attachment of an electronic mail to a recipient in accordance with one embodiment of the present invention. The system 400 can include at least one processor 405 coupled to memory elements 410 through a system bus 415. As such, the system 400 can store program code within memory elements 410. The processor 405 can execute the program code accessed from the memory elements 410 via the system bus 415. In one aspect, for example, the system 400 can be implemented as computer that is suitable for storing and/or executing program code. It should be appreciated, however, that system 400 can be implemented in the form of any system or systems comprising at least one processor and memory that is capable of performing the functions described within this specification.

The memory elements 410 can include one or more physical memory devices such as, for example, local memory 420 and one or more bulk storage devices 425. Local memory 420 refers to random access memory or other non-persistent memory device(s) generally used during actual execution of the program code. Bulk storage device(s) 425 can be implemented as one or more storage devices, examples of which include, but are not limited to, hard drives, solid state drives, or other persistent data storage devices. The system 400 also can include one or more cache memories (not shown) that provide temporary storage of at least some program code in order to reduce the number of times program code must be retrieved from bulk storage device 425 during execution.

A network adapter 430 can be coupled to the system 400 to enable the system 400 to become coupled to other systems, computer systems, and/or remote storage devices through intervening private or public networks. Modems, cable modems, and Ethernet cards are examples of different types of network adapters that can be used with system 400. The network adapter 430 can be coupled to the system 400 either directly or through intervening I/O controller.

As pictured in FIG. 4, the memory elements 410 can store the EM server 102, the email server 104 and/or the IM server 106. Alternatively, one or more of the servers 102-106 can be stored on one or more other systems. The EM server 102, email server 104 and IM server 106 can be executed by the processor 405, or the processor 405 and one or more other processors, to implement the processes and methods described herein. In one embodiment, the EM server 102, email server 104 and IM server 106 can be implemented as IBM® Lotus Notes® (IBM and Lotus Notes are trademarks of International Business Machines Corporation in the United States, other countries, or both).

The memory elements 410 further can store policy settings 435 related to the EM server 102. The policy settings can be configured to control the behavior of the EMS server 102, email server 104 and IM server 106, and provide processing instructions to handle various situations that may be encountered, including unexpected situations. For example, the policy settings 435 can define how long attachments are to be stored before they are deleted or otherwise disposed of. For example, the policy settings 435 can specify how long attachments are to be temporarily stored, and whether to delete or remove the attachments from the storage when the attachments are sent. The policy settings 435 also can define how many attempts are to be made to deliver the attachment via IMs and at what frequency such attempts are made. In illustration, the policy settings 435 can be configured to try to transfer the attachment via an IM every hour, every day, etc.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a system comprising a processor and a memory, a method of sending an attachment of a first electronic mail (email) to a recipient, the method comprising:
   receiving the first email addressed to the recipient;
   via the processor, determining whether a volume of data contained in the recipient's electronic mailbox has reached a threshold level;
   when the volume of data has reached the threshold level, via the processor:
      initiating establishment of an instant messaging session with an instant messaging client associated with the recipient;
      causing the attachment to be attached to an instant message; and
      initiating sending of the instant message to the instant messaging client associated with the recipient.

2. The method of claim 1, further comprising:
   configuring the instant message to be presented to the recipient with an indicator indicating that the attachment is attached to the instant message.

3. The method of claim 1, further comprising:
   configuring the instant message to automatically initiate storage of the attachment to a storage device accessible by the recipient.

4. The method of claim 3, further comprising:
   within the instant message, providing a hyperlink to a storage location where the attachment is stored on the storage device.

5. The method of claim 3, further comprising:
   sending a second e-mail to an email client associated with the recipient, the second email comprising a hyperlink to a storage location where the attachment is stored on the storage device.

6. The method of claim 1, further comprising:
   removing the attachment from the first email;
   appending a notification to the first email indicating to the recipient that the attachment has been removed from the first e-mail and sent to the recipient via the instant message; and
   sending the first email to an email client associated with the recipient.

7. The method of claim 1, further comprising:
   configuring the instant message to present to the recipient an indicator that indicates the attachment is attached to the instant message.

8. The method of claim 1, further comprising:
   determining whether the instant message was successfully delivered to the instant messaging client associated with the recipient; and
   when the instant message was not successfully delivered to the instant messaging client associated with the recipient, initiating re-sending of the instant message.

9. The method of claim 1, further comprising:
   causing the attachment to be stored, at least temporarily, until the instant message is sent.

10. Within a system comprising a processor and a memory, a method of sending an attachment of a first electronic mail (email) to a recipient, the method comprising:
receiving the first email addressed to the recipient;
via the processor, determining whether a volume of data contained in the recipient's electronic mailbox has reached a threshold level;
when the volume of data has reached the threshold level, via the processor:
causing the attachment to be stored to a storage device, at least temporarily;
initiating establishment of an instant messaging session with an instant messaging client associated with the recipient;
causing the attachment to be attached to an instant message; and
initiating sending of the instant message to the instant messaging client associated with the recipient.

11. The method of claim 10, further comprising:
causing the attachment to be deleted from the storage device when the instant message is sent.

12. A computer program product comprising:
a computer readable storage device having stored thereon computer readable program code that, when executed by a system comprising a processor and a memory, sends an attachment of a first electronic mail (email) to a recipient, the computer readable storage device comprising:
computer readable program code that receives the first email addressed to the recipient;
computer readable program code that determines whether a volume of data contained in the recipient's electronic mailbox has reached a threshold level;
computer readable program code that, when the volume of data has reached the threshold level:
initiates establishment of an instant messaging session with an instant messaging client associated with the recipient;
causes the attachment to be attached to an instant message; and
initiates sending of the instant message to the instant messaging client associated with the recipient.

13. The computer program product of claim 12, wherein the computer readable storage device further comprises:
computer readable program code that configures the instant message to be presented to the recipient with an indicator indicating that the attachment is attached to the instant message.

14. The computer program product of claim 12, wherein the computer readable storage device further comprises:
computer readable program code that configures the instant message to automatically initiate storage of the attachment to a storage device accessible by the recipient.

15. The computer program product of claim 14, wherein the computer readable storage device further comprises:
computer readable program code that, within the instant message, provides a hyperlink to a storage location where the attachment is stored on the storage device.

16. The computer program product of claim 14, wherein the computer readable storage device further comprises:
computer readable program code that sends a second e-mail to an email client associated with the recipient, the second email comprising a hyperlink to a storage location where the attachment is stored on the storage device.

17. The computer program product of claim 12, wherein the computer readable storage device further comprises:
computer readable program code that removes the attachment from the first email;
computer readable program code that appends a notification to the first email indicating to the recipient that the attachment has been removed from the first e-mail and sent to the recipient via the instant message; and
computer readable program code that sends the first email to an email client associated with the recipient.

18. The computer program product of claim 12, wherein the computer readable storage device further comprises:
computer readable program code that configures the instant message to present to the recipient an indicator that indicates the attachment is attached to the instant message.

19. The computer program product of claim 12, wherein the computer readable storage device further comprises:
computer readable program code that determines whether the instant message was successfully delivered to the instant messaging client associated with the recipient; and
computer readable program code that, when the instant message was not successfully delivered to the instant messaging client associated with the recipient, initiates re-sending of the instant message.

20. The computer program product of claim 12, wherein the computer readable storage device further comprises:
computer readable program code that causes the attachment to be stored, at least temporarily, until the instant message is sent.

* * * * *